US010965052B2

(12) United States Patent
Shikanai et al.

(10) Patent No.: US 10,965,052 B2
(45) Date of Patent: Mar. 30, 2021

(54) CONNECTOR HOLDING MECHANISM

(71) Applicant: Panasonic Intellectual Property Management Co., Ltd., Osaka (JP)

(72) Inventors: Masaki Shikanai, Kanagawa (JP); Yoshinari Matsuyama, Osaka (JP); Takeshi Kikuchi, Osaka (JP); Yuzuka Isobe, Osaka (JP); Takeru Sakamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/984,616

(22) Filed: Aug. 4, 2020

(65) Prior Publication Data

US 2020/0366022 A1 Nov. 19, 2020

Related U.S. Application Data

(63) Continuation of application No. PCT/JP2019/004012, filed on Feb. 5, 2019.

(30) Foreign Application Priority Data

Feb. 5, 2018 (JP) ............................ JP2018-018697

(51) Int. Cl.
*H01R 13/64* (2006.01)
*H01R 13/24* (2006.01)
*H01R 13/17* (2006.01)

(52) U.S. Cl.
CPC ......... *H01R 13/2421* (2013.01); *H01R 13/17* (2013.01)

(58) Field of Classification Search
CPC ............................ H01R 13/24; H01R 13/2421
(Continued)

(56) References Cited

U.S. PATENT DOCUMENTS 4,558,270 A * 12/1985 Liautaud ............... H02J 7/0045 320/110
4,588,938 A * 5/1986 Liautaud ............... H02J 7/0045 320/115
(Continued)

FOREIGN PATENT DOCUMENTS

JP 06-052930 2/1994
JP 08-138793 5/1996
(Continued)

OTHER PUBLICATIONS

International Search Report dated May 7, 2019 in International (PCT) Application No. PCT/JP2019/004012 with English translation.

(Continued)

*Primary Examiner* — Neil Abrams
(74) *Attorney, Agent, or Firm* — Wenderoth, Lind & Ponack, L.L.P.

(57) ABSTRACT

A connector holding mechanism includes a biasing member provided in a through hole formed in a bottom plate of a storage body, a cover having a connector insertion hole and an inclined surface which is fixed to the through hole, a connector, in which a terminal is loosely inserted into the connector insertion hole, and a flange portion protruding from an outer periphery of the housing biased by the biasing member. When the connector is waiting to be fitted to a stored object, the connector is held in a posture where the terminal is inclined due to abutment between the inclined surface and the flange with respect to a virtual line perpendicular to the bottom surface, and when the connector is fitted to the stored object, the connector is held in a posture where the terminal is vertical along the virtual line.

5 Claims, 10 Drawing Sheets

13 39 11 57 17 51 19 51 61 63 37 25 31 43 33 29 35 35 41 45 23 27 47 47 55 55
UPPER REAR RIGHT LEFT FRONT LOWER

(58) Field of Classification Search
USPC .................. 439/247, 248, 929; 320/113, 115
See application file for complete search history.

(56) References Cited

U.S. PATENT DOCUMENTS

| | | | | |
|---|---|---|---|---|
| 5,052,943 | A * | 10/1991 | Davis .................... | H02J 7/0042 439/357 |
| 5,686,810 | A * | 11/1997 | Yasui .................... | H01M 10/46 320/113 |
| 5,964,601 | A * | 10/1999 | Tsurumaru ............. | B60R 11/02 439/141 |
| 7,014,486 | B1 * | 3/2006 | Wu ...................... | G06F 1/1632 439/165 |
| 7,090,521 | B2 * | 8/2006 | Nishio ............... | H01R 13/6315 439/248 |
| 7,311,541 | B2 * | 12/2007 | Chien .................. | H01R 13/748 439/246 |
| 7,719,830 | B2 * | 5/2010 | Howarth .............. | G06F 1/1632 361/679.41 |
| 8,007,309 | B2 * | 8/2011 | Fan ........................ | H01R 13/74 439/376 |
| 8,113,873 | B1 * | 2/2012 | Sarraf ................ | H01R 13/6315 439/533 |
| 8,210,861 | B2 * | 7/2012 | Tanis ................. | H01R 13/6315 439/248 |
| 8,535,102 | B1 * | 9/2013 | Colahan ................ | H01R 31/06 439/638 |
| 8,545,247 | B2 * | 10/2013 | Aldana .............. | H01R 13/6315 439/248 |
| 8,721,356 | B2 * | 5/2014 | Webb .................. | H04M 1/0274 439/248 |
| 8,986,029 | B2 * | 3/2015 | Webb ...................... | H05K 7/14 439/248 |
| 9,075,573 | B2 * | 7/2015 | Hayashida ............ | G06F 1/1632 |
| 9,093,849 | B2 * | 7/2015 | Carreon .................... | H02J 7/00 |
| 9,103,484 | B2 * | 8/2015 | Hayashi ................. | F16M 13/00 |
| 9,466,927 | B2 * | 10/2016 | Ardisana, II ....... | H01R 13/6315 |
| 9,778,690 | B2 * | 10/2017 | Ardisana, II .......... | G06F 1/1632 |
| 10,554,002 | B2 * | 2/2020 | Okazaki ................ | G06F 1/1632 |
| 10,664,002 | B2 * | 5/2020 | Parazynski .............. | G05G 1/02 |
| 2004/0203267 | A1 * | 10/2004 | Chen ...................... | F16M 13/00 439/76.1 |
| 2008/0259550 | A1 * | 10/2008 | Lien .................... | B60R 11/0211 361/679.02 |
| 2011/0008991 | A1 | 1/2011 | Fan | |
| 2020/0366022 | A1 * | 11/2020 | Shikanai ............ | H01R 13/2421 |

FOREIGN PATENT DOCUMENTS

| | | |
|---|---|---|
| JP | 2003-187913 | 7/2003 |
| JP | 2011-18642 | 1/2011 |
| JP | 2013-025855 | 2/2013 |
| JP | 2016-066443 | 4/2016 |
| WO | 2005/047052 | 5/2005 |

OTHER PUBLICATIONS

Written Opinion of the International Searching Authority dated May 7, 2019 in International Application No. PCT/JP2019/004012.

Extended European Search Report dated Jan. 25, 2021 in corresponding European Patent Application No. 19746703.8.

* cited by examiner 25
37
31
53
33
29
19
θ
51
61
63
17
27
23
45
57
47
55
47

CONNECTOR HOLDING MECHANISM

BACKGROUND OF THE INVENTION

1. Field of the Invention

The present disclosure relates to a connector holding mechanism.

2. Description of the Related Art

JP-A-H08-138793 discloses a drip-proof pin connector in which a terminal pin biased by a coil spring in a protruding direction is accommodated in a holder. In such a drip-proof pin connector, a rubber packing material is fixed to the terminal pin, and a rubber lid body is attached to the holder, so that the packing material is in close contact with a shaft portion of the terminal pin, and an outer peripheral surface of the lid body is in close contact with an inner peripheral surface of the holder. A cylindrical portion of the packing material is fitted into a space between a boss portion of the lid body and the holder, and a meandering gap, where water droplets are unlikely to enter, is formed in a fitting portion thereof.

SUMMARY

The present disclosure has been devised in view of the above-described situation in the related art, and provides a connector holding mechanism in which coupling is easily performed and a decrease in connection reliability in a coupled state is prevented.

The present disclosure provides a connector holding mechanism which includes: a biasing member provided in a through hole formed in a bottom plate of a storage body, at least a lower end of the biasing member being supported on a lower surface side of the bottom plate; a cover, that includes a connector insertion hole and an inclined surface which is fixed to the through hole at a position above the biasing member, the inclined surface being inclined with respect to a bottom surface of the bottom plate at a lower surface of the cover; and a connector loosely inserted into the connector insertion hole and having a housing on which a terminal is protruded above the bottom surface, and a flange portion protruding from an outer periphery of the housing being biased by the biasing member. In a state where the connector is waiting to be fitted to a stored object stored in the storage body, the connector is held in a posture in which the pin terminal is inclined due to abutting between the inclined surface and the flange portion by a predetermined angle with respect to a virtual line perpendicular to the bottom surface. In a state where the connector is fitted to the stored object, the connector is held in a posture in which the terminal is vertical along the virtual line due to separation between the inclined surface and the flange portion.

According to the present disclosure, coupling can be easily performed, and the decrease in the connection reliability in the coupled state can be prevented.

DETAILED DESCRIPTION OF THE EXEMPLARY EMBODIMENTS

Background to Contents of Embodiment 1

Figure 1:
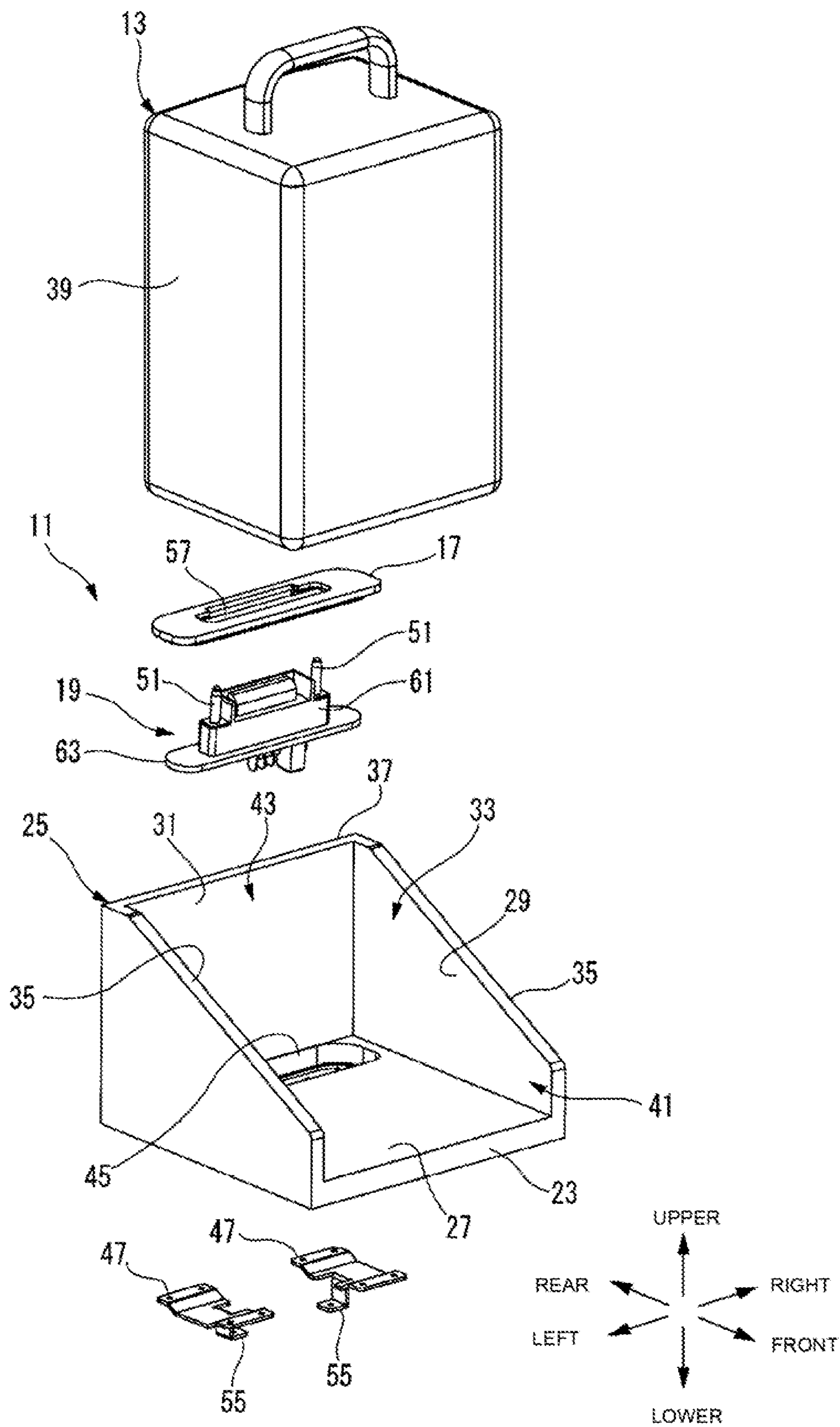
FIG. 1 is an exploded perspective view showing a storage device provided with a connector holding mechanism according to Embodiment 1 together with a package body.

When a battery is charged, a connector is used for connection with a mating side (that is, a power supply side). As an example of a mechanism for holding such a connector, in the drip-proof pin connector disclosed in JP-A-H08-138793 described above, the terminal pin is held by the holder in a vertical direction. When an attachment direction of the battery is limited to the vertical direction, it is necessary to secure an attachment work space on an upper side in the vertical direction. In this case, for example, it is difficult to secure a large attachment work space on the upper side in the vertical direction in an in-vehicle storage device where the battery is placed. The large attachment work space cannot be secured on the upper side in the vertical direction especially when a heavy object, such as a battery, is placed, which may cause difficulty in the attachment work.

In the drip-proof pin connector of JP-A-H08-138793 described above, since the terminal pin is brought into contact with a flat surface of a mating side electrode, insulating powder is generated when the terminal pin and the mating side electrode are rubbed against each other due to vibration or the like. When the insulating powder is interposed between the terminal pin and the mating side electrode, electric resistance is increased, and connection reliability in a coupled state is thus reduced.

Meanwhile, in a general connector, male and female housings are fitted to each other to connect terminals to each other. In this case, the terminals are not easily rubbed against each other. However, in a structure in which the male and female housings are fitted to each other, when an external force is applied due to vibration or impact in state where the connector is fitted to a mating side connector (hereinafter abbreviated as "mating connector"), the housings and the terminals may be damaged. As a result, the connection reliability in the coupled state is also reduced.

Therefore, in the following embodiment, an example of a connector holding mechanism, in which coupling is easily performed and the decrease in the connection reliability in the coupled state is prevented, will be described.

Hereinafter, the embodiment (hereinafter, referred to as "the present embodiment") that specifically discloses the connector holding mechanism according to the present disclosure will be described in detail with reference to the drawings as appropriate. However, unnecessarily detailed descriptions may be omitted. For example, a detailed description of a well-known matter or a repeated description of substantially the same configuration may be omitted. This is to prevent the following description from being unnecessarily redundant and to facilitate understanding of those skilled in the art. The accompanying drawings and the following description are provided for those skilled in the art to facilitate thorough understanding of the present disclosure, and are not intended to limit the claimed subject matters. In the following description, a specific embodiment of the connector holding mechanism according to the present disclosure will be described, and a storage device including the connector holding mechanism may be included in the present disclosure.

FIG. 1 is an exploded perspective view showing a storage device 11 provided with a connector holding mechanism according to Embodiment 1 together with a package body 13. In Embodiment 1, upper and lower, front and rear, left and right directions follow directions of arrows shown in FIG. 1. The connector holding mechanism includes a biasing member (for example, a coil spring 15), a cover 17, and a connector 19 as main components.

The connector holding mechanism can be suitably used, for example, in the storage device 11.

The storage device 11 stores the package body 13 as an example of an object to be stored. In Embodiment 1, the package body 13 is formed, for example, as a vertically elongated substantially rectangular parallelepiped. A handle is provided on an upper surface of the package body 13 to make it easier for a person to grasp. Examples of application of the package body 13 include, for example, a rechargeable battery and a tank (for example, a tank into which water or kerosene is injected) serving as load bodies (that is, heavy objects), and it is needless to say that the package body 13 is not limited thereto. The package body 13 can have a weight of, for example, about several Kg (kilograms) to 10 Kg (kilograms). A mating connector 21 (see FIG. 3) is provided on a lower surface of the package body 13. The mating connector 21 is coupled to the connector 19 which is provided on a bottom plate 23 of the storage device 11.

A storage body 25 surrounds a storage space (an example of a storage portion 33) by a bottom surface 27, a pair of parallel inner side surfaces 29, and a back surface 31. The bottom surface 27 is an upper side surface of the substantially square bottom plate 23. The pair of parallel inner side surfaces 29 are opposite surfaces of a pair of triangular side plates 35. The back surface 31 stands perpendicularly from the bottom plate 23 and serves as a front side surface of a horizontally elongated rectangular back plate 37 which connects the pair of side plates 35. The pair of parallel inner side surfaces 29 faces a pair of parallel package side surfaces 39 of the package body 13 with a clearance therebetween, such that insertion of the package body 13 is guided.

Since a front surface opening portion 41 and an upper surface opening portion 43 of the storage body 25 are continuous, the storage space is opened to two orthogonal planes adjacent to each other. The storage body 25 allows the package body 13 to be inserted into the storage space from a plurality of directions (for example, an upward direction and an obliquely forward direction) by using the front surface opening portion 41 and the upper surface opening portion 43 as insertion openings.

The bottom plate 23 includes a through hole 45 in the vicinity of the back plate 37. The through hole 45 is formed in an oval shape, which is elongated in a left-right direction along the back plate 37, and penetrates the bottom plate 23. The connector 19 is provided in the through hole 45. Moreover, the cover 17 is provided above the connector 19 in the through hole 45. The connector 19 is supported by a bracket 47, which is fixed to a lower surface of the bottom plate 23, via the biasing member.

Figure 8:
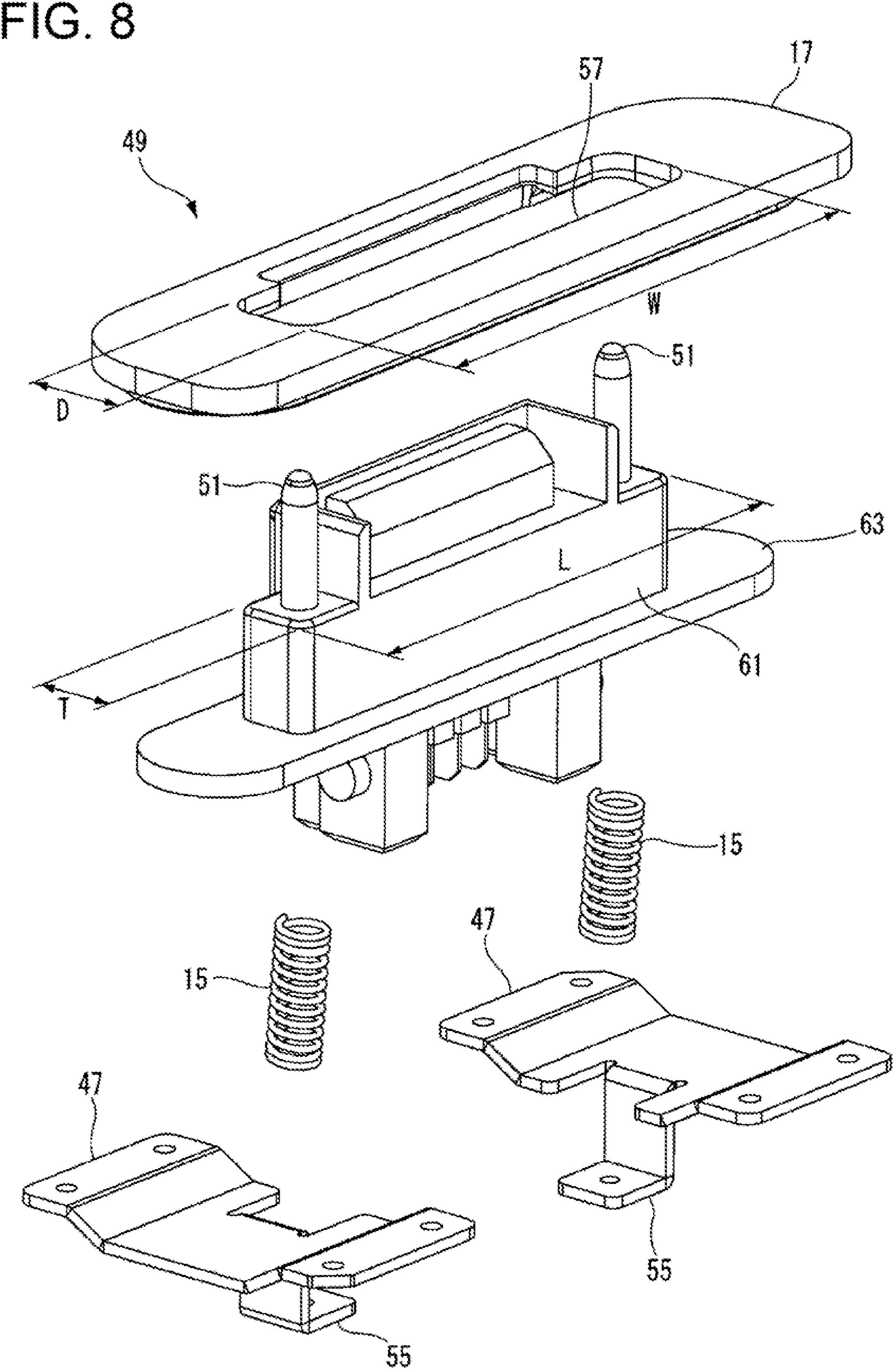
FIG. 8 is an exploded perspective view of the connector unit shown in FIG. 7.

In Embodiment 1, the biasing member is the coil spring 15 (see FIG. 8). The biasing member may also be a leaf spring or an elastic body, such as rubber or sponge, instead of the coil spring 15.

The cover 17, the connector 19, the coil spring 15, and the bracket 47 constitute a connector unit 49.

Members on which the bottom surface 27, the inner side surface 29 and the back surface 31 are formed are not limited to the bottom plate 23, the side plate 35 and the back plate 37, and may be block bodies which do not have plate shapes. Moreover, the bottom surface 27, the inner side surface 29 and the back surface 31 may also be integrally formed. Moreover, the pair of side plates 35 may not be parallel to each other, and may face each other obliquely, while heights thereof may be the same or different.

Figure 2:
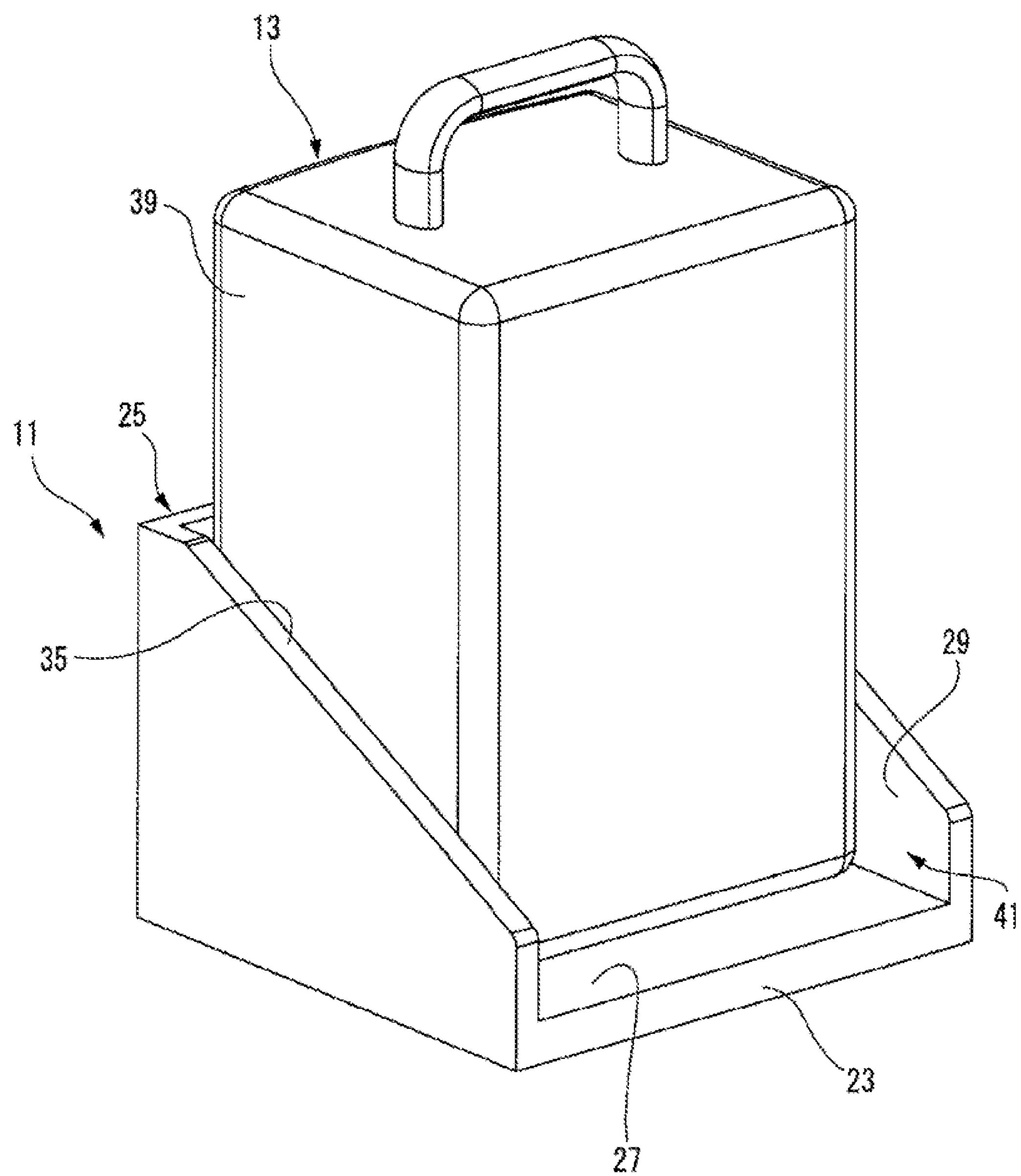
FIG. 2 is a perspective view showing a state where the package body is stored in the storage device of FIG. 1.

FIG. 2 is a perspective view showing a state where the package body 13 is stored in the storage device 11 of FIG. 1. The package body 13 is placed on the bottom plate 23 which is provided with the through hole 45, the cover 17 and the connector unit 49, and is accommodated in the storage body 25.

Figure 3:
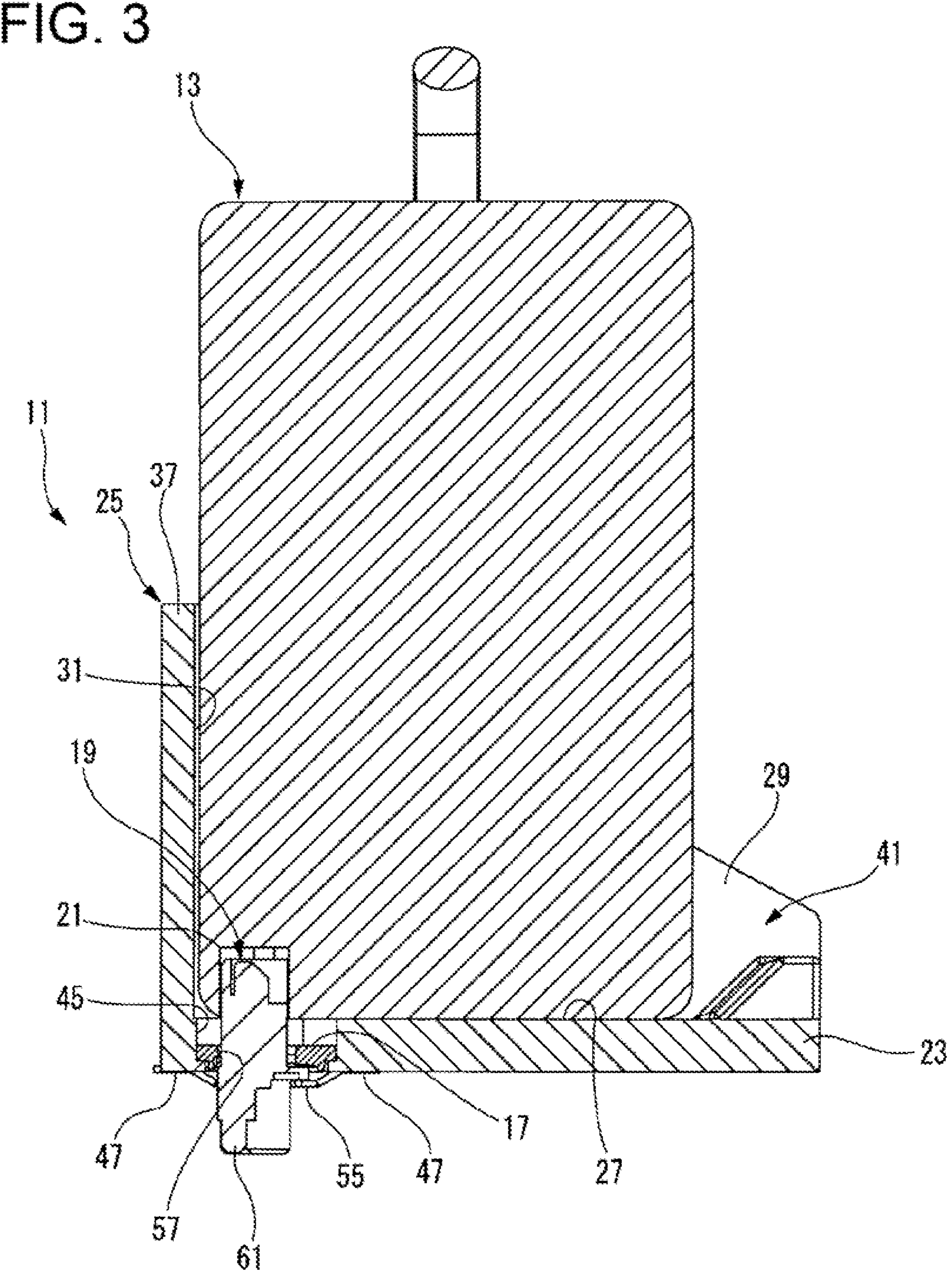
FIG. 3 is a side cross-sectional view of the storage device and the package body shown in FIG. 2.

FIG. 3 is a side cross-sectional view of the storage device 11 and the package body 13 shown in FIG. 2. The mating connector 21 provided on the package body 13 can be, for example, a female connector in which a female terminal is accommodated in a female housing made of an insulating resin. Meanwhile, the connector 19 provided on the storage device 11 can be, for example, a male connector in which a pin terminal 51 is provided on a male housing made of an insulating resin.

Figure 4:
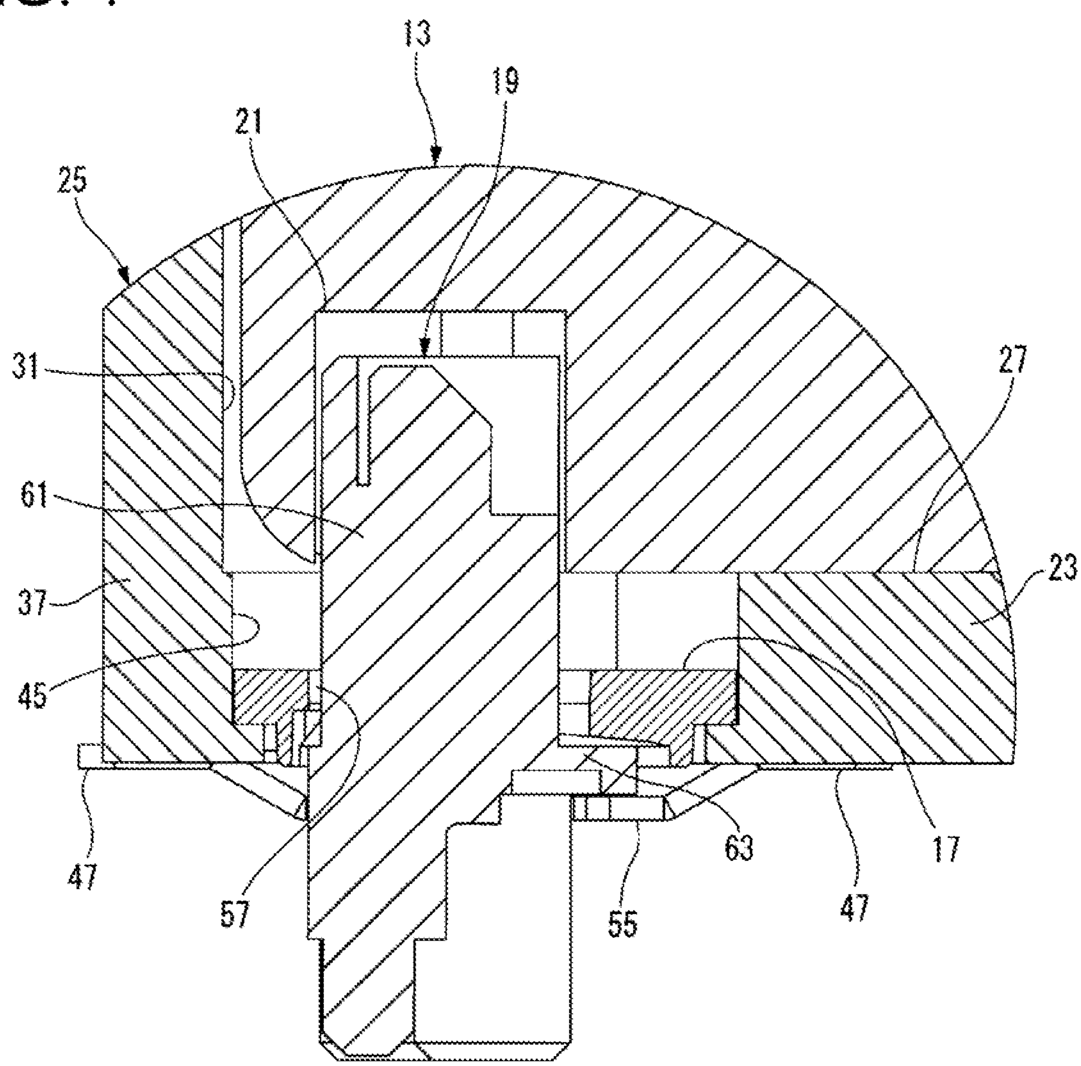
FIG. 4 is a main part enlarged view of FIG. 3.

FIG. 4 is a main part enlarged view of FIG. 3. When the package body 13 is accommodated in the storage body 25, the connector 19 in the connector unit 49 is fitted to the mating connector 21 of the package body 13.

Figure 5:
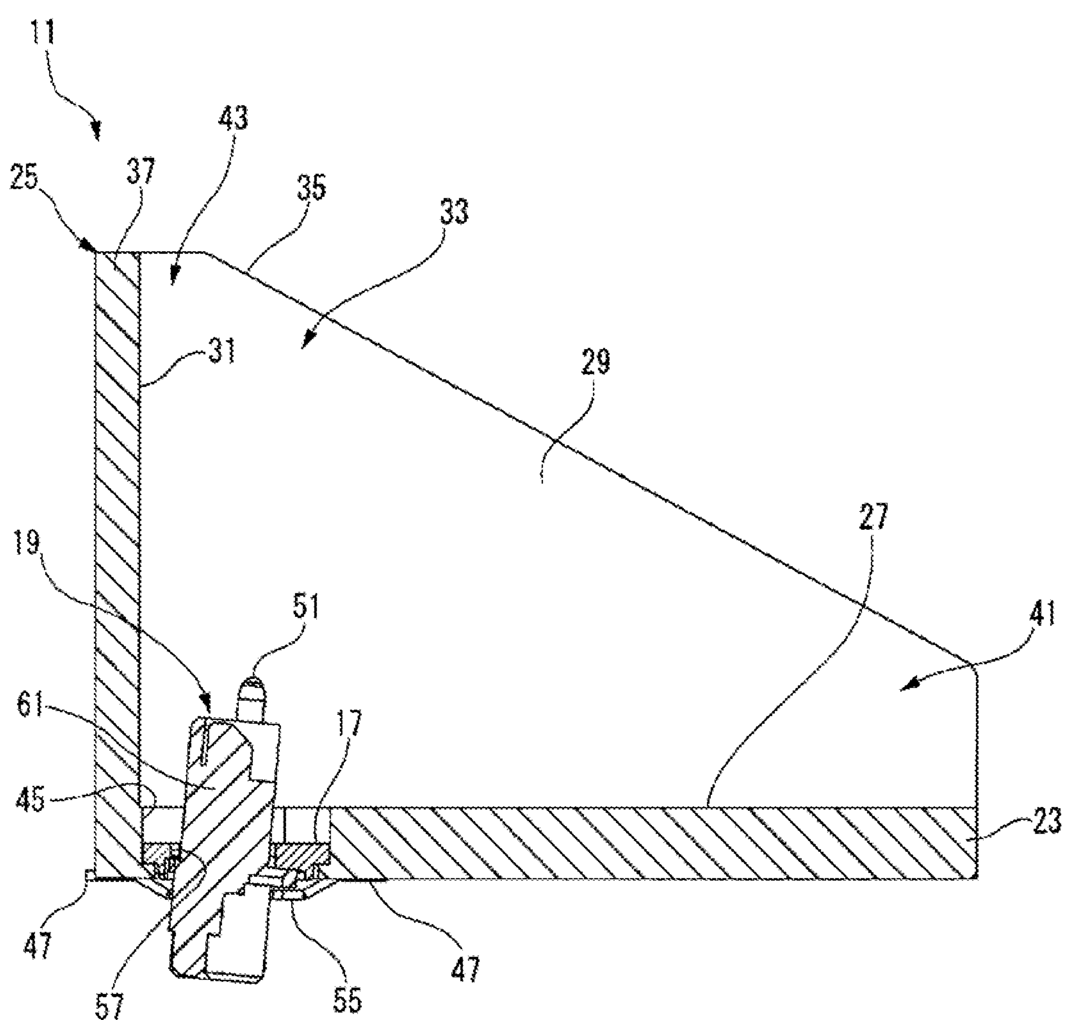
FIG. 5 is a side cross-sectional view of the storage device in which the package body is not stored.

FIG. 5 is a side cross-sectional view of the storage device 11 in which the package body 13 is not stored. In a state where the package body 13 is not accommodated, the connector unit 49 is held in a forward inclining posture in which the connector 19 is inclined forward (see FIG. 1). The connector 19 in the forward inclining posture is at least capable of being pressed down or swinging in a vertical standing direction.

Figure 6:
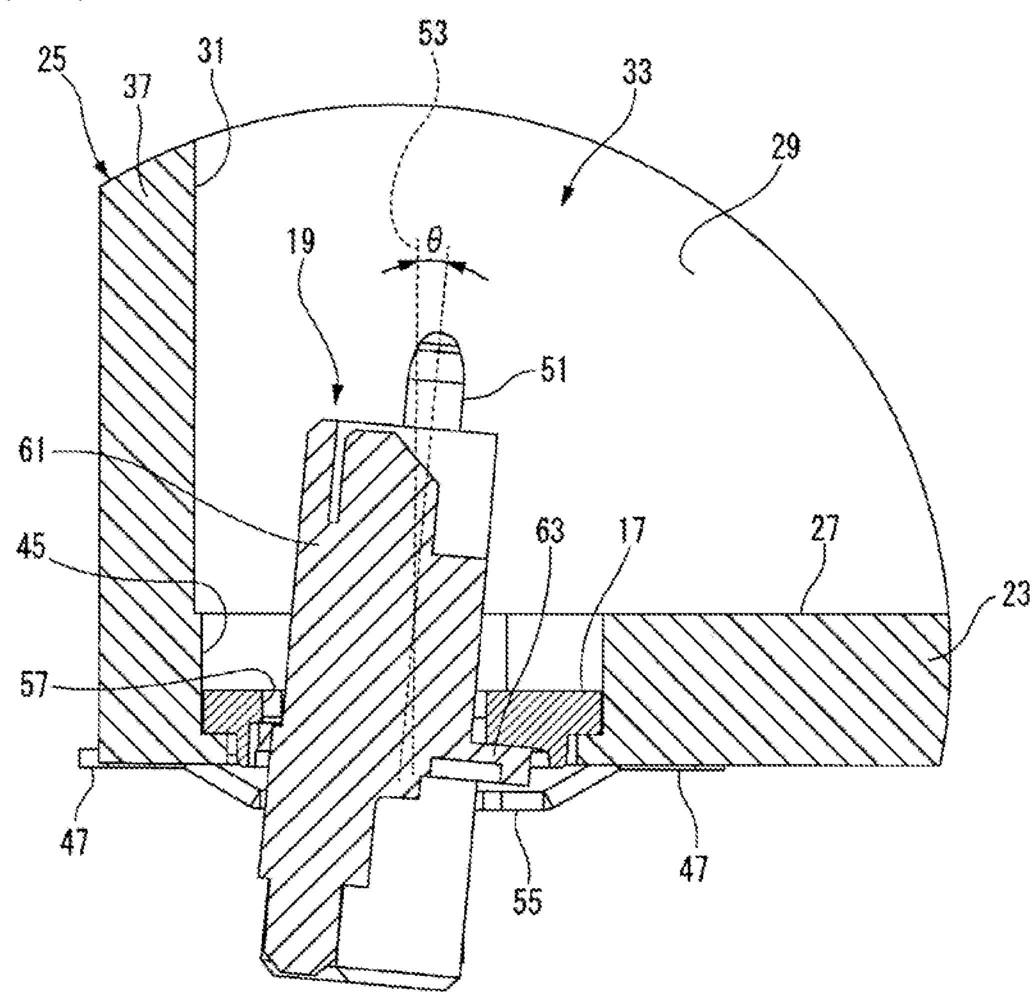
FIG. 6 is a main part enlarged view of FIG. 5.

FIG. 6 is a main part enlarged view of FIG. 5. That is, the connector unit 49 is held in a waiting state in a posture in which the pin terminal 51 of the connector 19 is inclined at a predetermined angle θ with respect to a virtual line 53 perpendicular to the bottom surface 27.

Figure 7:
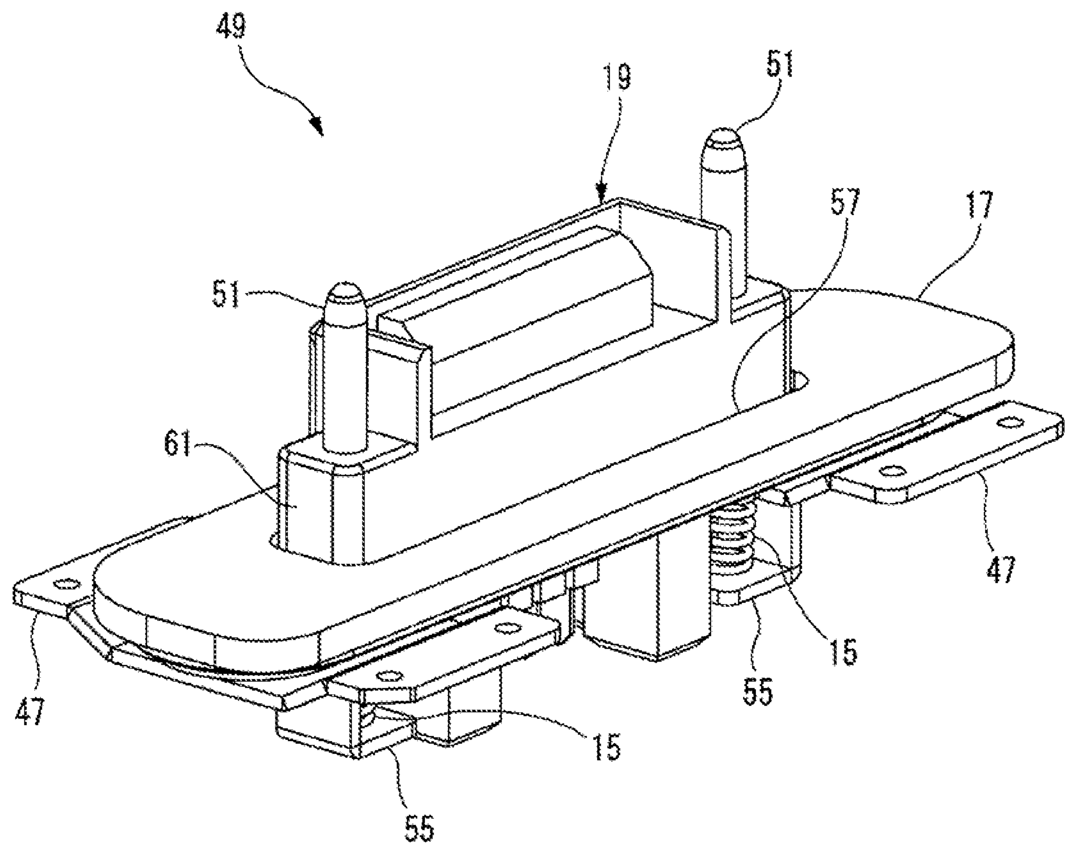
FIG. 7 is a perspective view of a connector unit provided with the connector holding mechanism.

FIG. 7 is a perspective view of the connector unit 49 provided with a connector holding mechanism. The connector 19 of the connector unit 49 penetrates the cover 17. The connector 19 which penetrates the cover 17 is biased upward from a lower surface side thereof by the coil spring 15.

FIG. 8 is an exploded perspective view of the connector unit 49 shown in FIG. 7. The coil spring 15 is provided in the through hole 45 formed in the bottom plate 23, and a lower end thereof is supported by a lower surface side of the bottom plate 23 while an upper end thereof serves as a free end. The coil spring 15 is supported by the lower surface of the bottom plate 23 via the bracket 47.

The connector 19 is formed to be elongated in the left-right direction which is parallel to the bottom surface 27. Both sides of the connector 19 in a longitudinal direction of the connector 19 are biased upward by a pair of the coil springs 15 such that left and right portions are equally biased.

More specifically, a lower end of the coil spring 15 is placed on an upper surface of a seat plate portion 55 which protrudes downward below the lower surface of the bottom plate 23. As a result, the coil spring 15 is supported on the lower surface side of the bottom plate 23 via the bracket 47.

The cover 17 includes a connector insertion hole 57 which is elongated in the left-right direction (D<W when D refers to a front-rear direction length while W refers to a left-right direction length). The cover 17 is fixed to the through hole 45 of the bottom plate 23 at a position above the coil spring 15.

Figure 9:
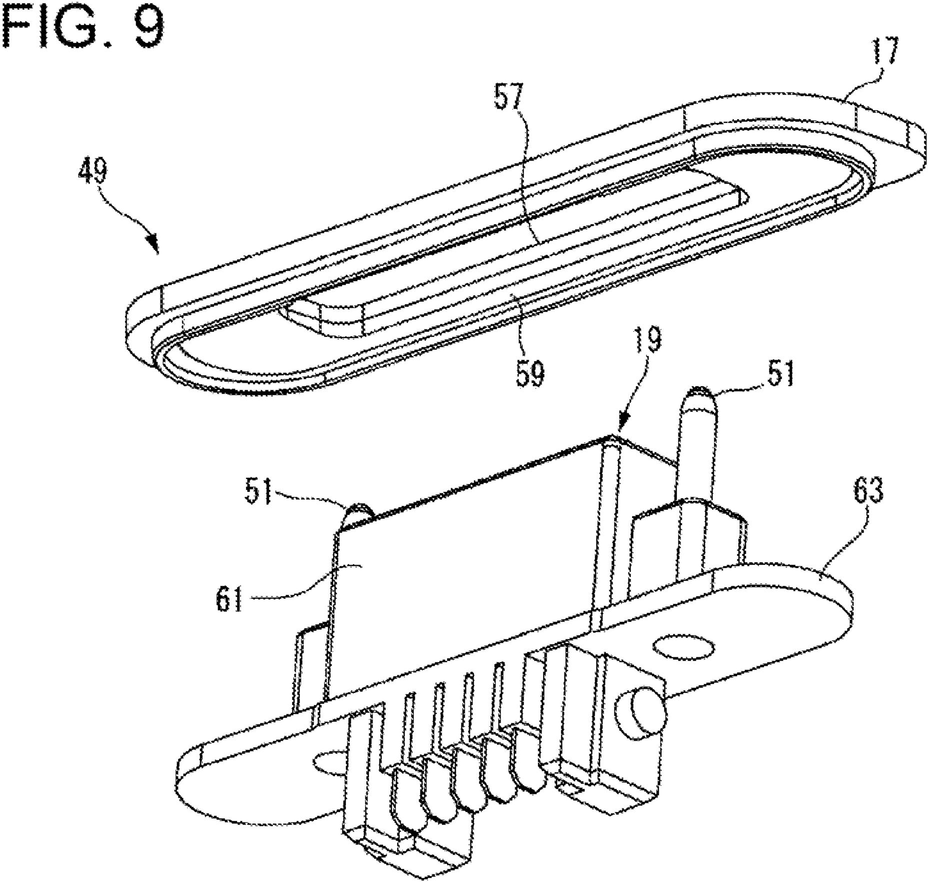
FIG. 9 is an exploded perspective view of the connector unit shown in FIG. 8 as viewed from below.
Figure 9:
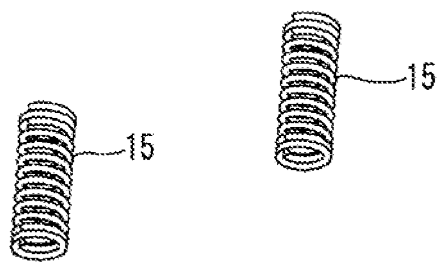
Figure 9:
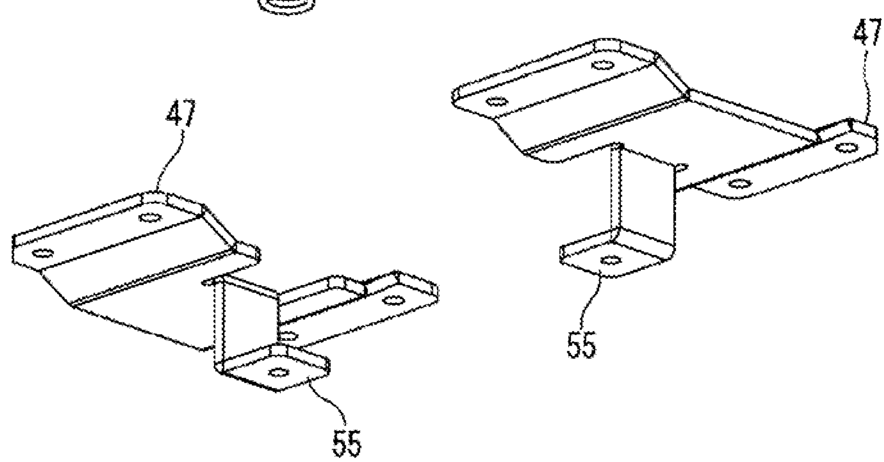

FIG. 9 is an exploded perspective view of the connector unit 49 shown in FIG. 8 as viewed from below. An inclined surface 59, which is inclined with respect to the bottom surface 27 of the bottom plate 23, is formed on a lower surface of the cover 17, which faces the coil spring 15. The inclined surface 59 is formed such that the connector insertion hole 57 is sandwiched in the front-rear direction. The inclined surface 59 is inclined toward a front side (see FIG. 1) with a downward gradient (see FIG. 11).

The connector 19 is loosely inserted into the connector insertion hole 57. The term "loosely inserted" means that the end penetrates the member (the cover 17) with a clearance therebetween. The connector 19 includes a pair of left and right pin terminals 51, which protrude upward above the bottom surface 27, in a housing 61. The housing 61 is formed in a flat rectangular parallelepiped shape that is thin in the front-rear direction and long in the left-right direction (T<L when T refers to a front-rear direction length while L refers to a left-right direction length). That is, sizes of the connector 19 and the connector insertion hole 57 are formed to satisfy a dimensional relationship of T<D and L<W.

The housing 61 includes a flange portion 63 which protrudes from an outer periphery thereof. An upper end of the compressed coil spring 15 abuts against the flange portion 63 from below. In the connector 19, when the flange portion 63 is biased upward by the coil spring 15, the inclined surface 59 and the flange portion 63 are abutted against each other. The connector 19 is held in the waiting state in the posture in which the pin terminal 51 is inclined at the predetermined angle θ with respect to the virtual line 53 perpendicular to the bottom surface 27 when the flange portion 63 abuts against the inclined surface 59.

On the other hand, in a state where the connector 19 is fitted to the mating connector, the pin terminal 51 is pressed down. When the connector 19 is against an urging force of the coil spring 15 and pressed down, the flange portion 63 is separated from the inclined surface 59. When the flange portion 63 is separated from the inclined surface 59, the posture of the connector 19 is restricted by a fitting structure of the mating connector 21, so that the pin terminal 51 is held in a vertical posture along the virtual line 53 at this time.

An inner wall surface 65, which surrounds the inclined surface 59 of the cover 17, is in contact with an outer periphery of the flange portion 63 at a corner portion 67 intersecting with the inclined surface 59 in the waiting state. The inner wall surface 65 is formed as a tapered surface (see FIG. 10) such that a gap 69 between the inner wall surface 65 and the outer periphery is widened as the inner wall surface 65 extends away from the inclined surface 59.

Next, effects of the connector holding structure according to Embodiment 1 will be described.

The connector holding mechanism according to Embodiment 1 includes the biasing member, the cover 17, and the connector 19. The biasing member (for example, the coil spring 15) is provided in the through hole 45 formed in the bottom plate 23 of the storage body 25, and the lower end thereof is supported by the lower surface side of the bottom plate 23 while the upper end thereof serves as a free end. The cover 17 includes the connector insertion hole 57 and includes the inclined surface 59 fixed to the through hole 45 at the position above the biasing member. The inclined surface 59 inclines with respect to the bottom surface 27 of the bottom plate 23 and is formed on a lower surface of the cover 17. The connector 19 is loosely inserted into the connector insertion hole 57. Moreover, the connector 19 includes the pin terminals 51, which protrude upward above the bottom surface 27, in the housing 61. Further, the upper end of the biasing member compressed by the flange portion 63 protruding from the outer periphery of the housing 61 abuts against the connector 19 from below to bias the connector 19 upward. The connector 19 is held in the waiting state in the posture in which the pin terminal 51 is inclined at the predetermined angle θ with respect to the virtual line 53 perpendicular to the bottom surface 27 when the inclined surface 59 and the flange portion 63 are abutted against each other. On the other hand, in the state where the connector 19 is fitted to the mating connector 21, the pin terminal 51 is pressed down and the flange portion 63 is separated from the inclined surface 59, so that the pin terminal 51 is held in the vertical posture along the virtual line 53. The state of being fitted to the mating connector 21 is, in other words, a state of being fitted to the package body 13.

Figure 10:
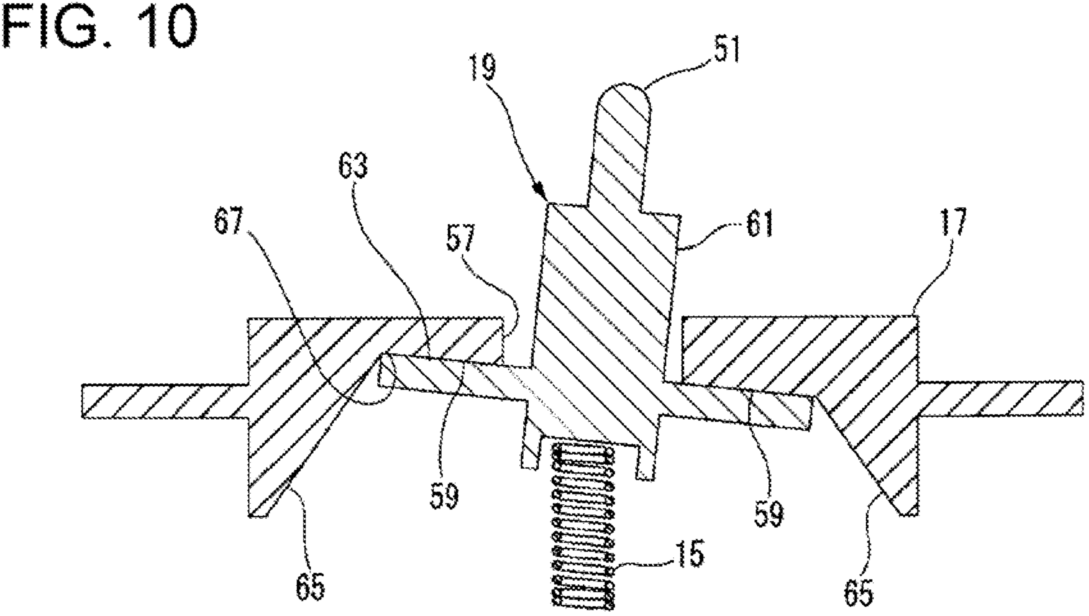
FIG. 10 is an operation explanatory diagram of a waiting state of the connector holding mechanism.

FIG. 10 is an operation explanatory diagram of the waiting state of the connector holding mechanism. In the connector holding mechanism according to Embodiment 1, during the waiting state shown in FIG. 10, the flange portion 63 of the housing 61 is abutted against the inclined surface 59 of the cover 17 due to the urging force of the biasing member. The connector 19 is held in the waiting state in the posture in which the pin terminal 51 is inclined at the predetermined angle θ with respect to the virtual line 53 perpendicular to the bottom surface 27 when the flange portion 63 abuts against the inclined surface 59.

Since the connector 19 is inclined as a result of the fact that the flange portion 63 abuts against the inclined surface 59, the posture thereof can be easily changed in the vertical direction. However, rearward sliding of the connecter 19 which is parallel to the bottom surface 27 is restricted. Therefore, the connector 19 can be fitted in the vertical direction and the inclination direction. As compared with the case where the fitting direction is limited to only the vertical direction, as in the structure of JP-A-H08-138793 described above, coupling of the connector 19 can be easily performed since fitting in the inclination direction is allowed. Therefore, according to the connector holding mechanism according to Embodiment 1, the connector 19 can be easily coupled, and connection reliability in a coupled state can be improved.

Since the coupling of the connector is enabled in the inclination direction, the connector holding mechanism is suitable for the in-vehicle storage device 11 where the package body 13 is heavy and there is a high demand for height reduction.

Figure 11:
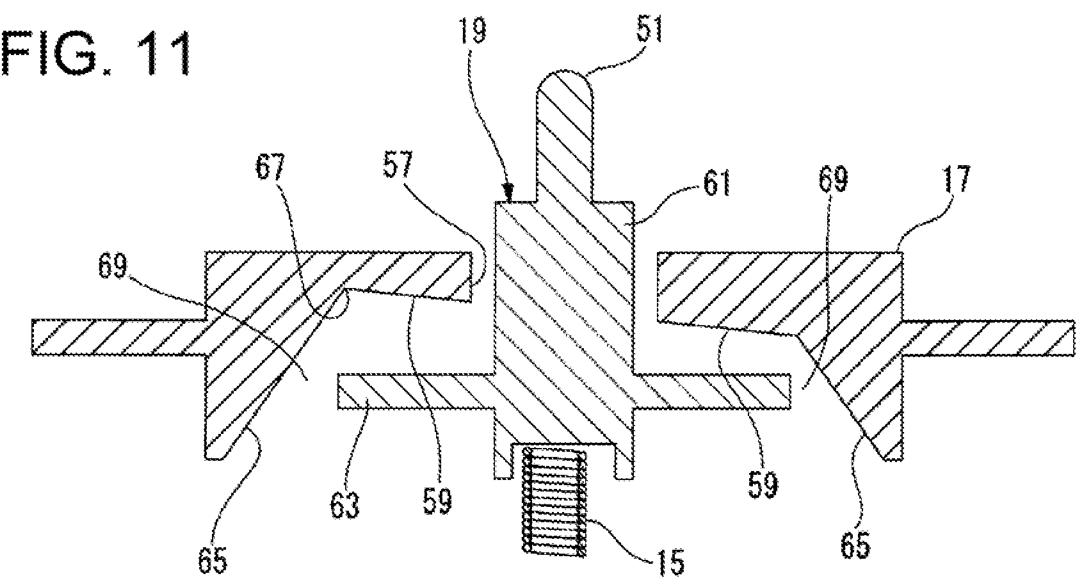
FIG. 11 is an operation explanatory diagram of a fitted-to-mating-connector state of the connector holding mechanism.

FIG. 11 is an operation explanatory diagram of the connector holding mechanism in the state of being fitted to the mating connector. When the connector holding mechanism is in the state of being fitted to the mating connector 21, as shown in FIG. 11, the pin terminal 51 is pressed down, and the flange portion 63 is separated from the inclined surface 59. The posture can be changed to an upright posture due to the separation of the flange portion 63. The housing 61 of the connector 19 is loosely inserted into the connector insertion hole 57 of the cover 17. That is, even when the package body 13 in which the mating connector 21 is provided is displaced, the housing 61, which is fitted to and integrated with the mating connector 21, is displaced integrally with the mating connector 21.

As a result, rubbing between the pin terminal 51 and a mating side electrode caused by vibration, impact, rotation, or the like is prevented, and insulating powder is less likely to be generated. As a result, an increase in electric resistance can be prevented, and the connection reliability in the coupled state can be improved as compared with a structure in the related art.

Since the housing 61, which is fitted to and integrated with the mating connector 21, is displaced integrally with the mating connector 21 even when the package body 13 in which the mating connector 21 is provided is displaced, the housing 61 and the terminals are hardly damaged even when an external force is applied due to vibration, impact, rotation, or the like. As a result, the connection reliability in the coupled state can be improved as compared with the structure in the related art.

In the connector holding mechanism, the inner wall surface 65 which surrounds the inclined surface 59 of the cover 17 is formed of the tapered surface which is in contact with the outer periphery of the flange portion 63 at the corner portion 67 intersecting the inclined surface 59, and the gap 69 between the tapered surface and the outer periphery increases as the tapered surface extends away from the inclined surface 59.

In the connector holding mechanism, the outer periphery of the flange portion 63 is in contact with the corner portion 67 where the inclined surface 59 of the cover 17 and the inner wall surface 65 intersect in the waiting state. In the waiting state, since the outer periphery of the flange portion 63 abuts against the corner portion 67 (that is, both the inclined surface 59 and the inner wall surface 65), easy sliding of the connector 19 in a rearward direction parallel to the bottom surface 27 is restricted. As a result, fitting with the mating connector 21 can be easily performed (the connector 19 is difficult to escape at the time of fitting).

Even in the waiting state, when the housing 61 is pressed down, the posture can be easily changed by rotation from an inclined posture shown in FIG. 10 to an upright posture shown in FIG. 11. When the pin terminal 51 is pressed down, since the inner wall surface 65 is formed as the tapered surface, the large gap 69 is formed between the outer periphery of the flange portion 63 and the tapered surface. The gap 69 prevents the housing 61 from restricting movement due to interference between the flange portion 63 and the inner wall surface 65. As a result, in the state of being fitted to the mating connector, the housing 61 is allowed to be displaced integrally with the mating connector 21 within a range in which the housing 61 is loosely inserted into the connector insertion hole 57.

A lower end of the biasing member of the connector holding mechanism is supported on the lower surface side of the bottom plate 23 by the bracket 47 which includes the seat plate portion 55 protruding downward below the lower surface of the bottom plate 23.

In the connector holding mechanism, since the seat plate portion 55 of the bracket 47 protrudes downward below the lower surface of the bottom plate 23, the coil spring 15, whose length is larger than a thickness of the bottom plate 23, can be attached to the bottom plate 23. As a result, the coil spring 15, which has large energy absorption and accumulation, can be used.

In the connector holding mechanism, the connector 19 is formed to be elongated in the direction parallel to the bottom surface 27, and the both sides of the connector 19 in the longitudinal direction of the connector 19 are biased by the pair of biasing members.

In the connector holding mechanism, since the both sides of the connector 19 in the longitudinal direction of the connector 19, which is formed in an elongated shape, are biased by the pair of biasing members, the connector 19 is hardly inclined with respect to the bottom surface 27 of the bottom plate 23 and can be easily moved up and down in parallel to the bottom surface 27 even though the connector 19 is formed in the elongated shape.

Further, in the connector holding mechanism, the biasing member is the coil spring 15.

In the connector holding mechanism, since the coil spring 15 is used as the biasing member, an external force can be absorbed from any direction around a winding axis of the coil spring 15 while an elastic restoring force can be applied. In particular, in the case where the connector 19 is loosely inserted into the connector insertion hole 57, the elastic restoring force can be uniformly applied to a press-down load from any direction more easily as compared with a case where a leaf spring is used. As a result, a pressing-down operation and an elastic restoring operation become smooth.

Although the embodiment has been described above with reference to the accompanying drawings, the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Constituent elements in the above-described embodiment may be optionally combined within a range not departing from the spirit of the invention.

For example, the package body 13 may not be the rectangular parallelepiped, each surface thereof may have a curved shape, and the package body 13 may have a cylindrical shape. Moreover, the inner side surface 29 and the back surface 31 may not be planar, and may be changed in accordance with the shape of the package body 13.

Although the pin terminal 51 is inclined by the inclined surface, the inclined surface may not be provided, and the pin terminal may not be inclined. In this case, since the inner wall surface 65 is formed by the tapered surface, as described above, the movement of the connector 19 is still restricted in the waiting state.

The present application is based on a Japanese patent application (No. 2018-018697) filed on Feb. 5, 2018, the contents of which are incorporated herein by reference.

The present disclosure is useful as a connector holding mechanism in which coupling is easily performed and a decrease in connection reliability in a coupled state is prevented.

What is claimed is:

1. A connector holding mechanism comprising:

a biasing member provided in a through hole formed in a bottom plate of a storage body, at least a lower end of the biasing member being supported on a lower surface side of the bottom plate;

a cover, that includes a connector insertion hole and an inclined surface which is fixed to the through hole at a position above the biasing member, the inclined surface being inclined with respect to a bottom surface of the bottom plate at a lower surface of the cover; and a connector loosely inserted into the connector insertion hole and having a housing on which a terminal is protruded above the bottom surface, and a flange portion protruding from an outer periphery of the housing being biased by the biasing member, wherein in a state where the connector is waiting to be fitted to a stored object stored in the storage body, the connector is held in a posture in which the terminal is inclined due to abutting between the inclined surface and the flange portion by a predetermined angle with respect to a virtual line perpendicular to the bottom surface, and in a state where the connector is fitted to the stored object, the connector is held in a posture in which the terminal is vertical along the virtual line due to separation between the inclined surface and the flange portion.

2. The connector holding mechanism according to claim 1, wherein an inner wall surface surrounding the inclined surface is formed of a tapered surface which is in contact with an outer periphery of the flange portion at a corner portion intersecting the inclined surface, and a gap between the tapered surface and the outer periphery increases as the tapered surface extends away from the inclined surface.

3. The connector holding mechanism according to claim 1, wherein the lower end of the biasing member is supported on the lower surface side of the bottom plate by a bracket which includes a seat plate portion protruding downward below a lower surface of the bottom plate.

4. The connector holding mechanism according to claim 1, wherein the connector is formed to be elongated in a direction parallel to the bottom surface; and wherein both sides of the connector in a longitudinal direction of the connector are biased by a pair of the biasing members.

5. The connector holding mechanism according to claim 1, wherein the biasing member is a coil spring.

* * * * *